United States Patent
Lee

(10) Patent No.: US 11,541,570 B2
(45) Date of Patent: Jan. 3, 2023

(54) COATING METHOD OF BOARD FOR PRODUCING CONCRETE PRODUCT AND BOARD COATED BY SAME

(71) Applicants: Hi-Man Lee, Pohang-si (KR); SAMJUNGCARRYWORLD CO., LTD., Pohang-si (KR)

(72) Inventor: Hi-Man Lee, Pohang-si (KR)

(73) Assignees: Hi-Man Lee, Pohang-si (KR); SAMJUNGCARRYWORLD CO., LTD., Pohang-si (KR)

( * ) Notice: Subject to any disclaimer, the term of this patent is extended or adjusted under 35 U.S.C. 154(b) by 557 days.

(21) Appl. No.: 16/668,455

(22) Filed: Oct. 30, 2019

(65) Prior Publication Data
US 2020/0215720 A1    Jul. 9, 2020

(30) Foreign Application Priority Data
Jan. 7, 2019 (KR) .......... 10-2019-0001661
Oct. 17, 2019 (KR) .......... 10-2019-0129346

(51) Int. Cl.
| B28B 7/38 | (2006.01) |
| B08B 5/04 | (2006.01) |
| B08B 1/02 | (2006.01) |
| B08B 5/02 | (2006.01) |
| B05D 1/02 | (2006.01) |

(52) U.S. Cl.
CPC .............. *B28B 7/386* (2013.01); *B28B 7/388* (2013.01); *B05D 1/02* (2013.01); *B08B 1/02* (2013.01); *B08B 5/023* (2013.01); *B08B 5/043* (2013.01)

(58) Field of Classification Search
CPC ............ B05D 1/02; B28B 7/386; B28B 7/388
See application file for complete search history.

(56) References Cited

U.S. PATENT DOCUMENTS

| 2012/0005846 A1* | 1/2012 | Lee ........................... B08B 1/02 15/4 |
| 2015/0089754 A1* | 4/2015 | Chan ....................... A47L 13/40 15/94 |
| 2017/0095825 A1* | 4/2017 | Manabe ................ B05B 14/412 |
| 2017/0320994 A1* | 11/2017 | Arita ...................... C08G 14/10 |

FOREIGN PATENT DOCUMENTS

| KR | 10-2010-0106080 A | 10/2010 |
| KR | 10-2012-0125944 A | 11/2012 |
| KR | 20120125944 | * 11/2012 |
| KR | 10-1496639 B1 | 3/2015 |

* cited by examiner

*Primary Examiner* — Nathan T Leong
(74) *Attorney, Agent, or Firm* — Rabin & Berdo, P.C.

(57) ABSTRACT

A coating method of a board for producing a concrete product and a board coated by the same are proposed. The coating method is advantageous in that the whole surface of a board can be rapidly coated and dried to prevent surface corrosion of the board and to prevent further corrosion on a damaged surface of the board, thus improving the durability of the board and the quality of the produced concrete products. The coating method includes: removing residues existing on an outer surface of the board by blowing high-pressure air to an upper surface and a lower surface of the board for producing a concrete product; coating by spraying coating liquid to the outer surface of the board from which the residues have been removed; and drying the coating liquid by blowing high-pressure air to the outer surface of the board.

7 Claims, 4 Drawing Sheets

COATING METHOD OF BOARD FOR PRODUCING CONCRETE PRODUCT AND BOARD COATED BY SAME

BACKGROUND OF THE INVENTION

Field of the Invention

The present invention generally relates to a coating method of a board for producing a concrete product and a board coated by the same. More particularly, the present invention relates to a coating method of a board for producing a concrete product and a board coated by the same, wherein unlike an anti-rust oil coating in which coating liquid remains on the existing boards, the whole surface of a board used for the production of concrete products can be rapidly coated and dried to prevent the surface corrosion of the board and to prevent further corrosion on a damaged surface of the board, whereby the durability of the board is improved and the quality of the produced concrete products is improved.

Description of the Related Art

Generally, a board is a product used in the process of producing concrete products having various shapes and purposes such as road blocks and retaining wall blocks like concrete blocks, concrete boundary stones, and concrete sidewalk blocks. The board is a product used essentially for successive massive production of the concrete products.

That is, the board, which is used as parts dedicated to a molding machine used to manufacture concrete products, is firstly located on the mold bottom of the molding machine, acts as a lower mold when filling concrete mortar in a mold having upper and lower parts of the mold communicating with each other to manufacture the concrete products such as bricks, and secondly serves as a pallet for transferring the concrete products from the mold to a curing room.

Wood, plastic, composite materials, and steel, etc. may be used as a material of the board that plays such a role. Since the environment in which the board is used is poor, the material is selected in consideration of characteristics such as tensile force, impact, and sag.

In addition, since the molding and curing of concrete products are carried out under high temperature (about 50 to 100° C.) with the concrete products containing moisture, that is, under conditions under which corrosion is easy to occur, the material of the board requires strong corrosion resistance and also abrasion resistance due to the friction of the board with the concrete products.

In the case of using stainless steel materials as a material of the board, problems such as corrosion and abrasion can be solved to some extent, but the stainless steel materials are difficult to use because of being not only expensive but also inferior in workability.

Accordingly, the board is manufactured of ordinary steel, which is relatively inexpensive and has good workability. As described above, since the molding and curing of concrete products are performed under alkaline conditions including moisture, the board made of steel, which is vulnerable to corrosion, is less durable, and when the surface corrosion of the board is severe, the defective rate of the concrete products cured on the board becomes higher.

In addition, due to the nature of the production of concrete products, components of framework such as cement, gravel, sand, etc. may remain mixed with each other on the surface of the board from which the concrete products are removed after curing, and the surface is scratched due to pressure and vibration of the molding machine.

In order to solve these problems, a method of applying an oil coating agent which contains inexpensive kerosene having an anti-rust effect to the surface of a board made of ordinary steel is used. The low cost oil coating agent is made by diluting the kerosene as a base with a small amount of chemicals and water, and thus has a disadvantage in that the oil coating agent is required to be applied daily to the surface of the board because it does not have a long lasting effect as a rust inhibitor.

In addition, the oil coating agent spreads in the air during application and spreads out all over the place, and is inhaled by workers, pollutes the environment around a factory, and is difficult to dispose of.

Furthermore, since the oil coating agent is applied daily to the surface of the board, oil is smeared on surfaces of concrete products manufactured on the board.

In this regard, a molding apparatus having a Teflon coating layer for a concrete product and a method of manufacturing the concrete product by using the same is disclosed in Korean Patent No. 10-1496639, and the main technical feature thereof is to form the Teflon coating layer on an inner surface of the molding apparatus for forming the concrete product.

The prior art has the technical feature of forming the Teflon coating layer on the inner side of the molding apparatus to facilitate the demoulding of the molded product, but forming the Teflon coating layer on the whole surface of the board to prevent corrosion and scratches is inefficient in terms of cost-effectiveness.

Furthermore, in order to keep the concrete-filled state of a concrete product tight in the production of the concrete product, a vibration compaction process is essential, and the board for producing a concrete product functions to transmit vibration of the molding machine to concrete located on an upper part of the board. When a Teflon coating layer is formed on an upper surface of the board, a sliding phenomenon occurs between the upper surface of the board and the concrete, and the vibration of the molding machine is not properly transmitted to the concrete. Therefore, Teflon coating is not suitable for the coating of the board.

DOCUMENT OF RELATED ART (Patent Document 1) Korean Patent No. 10-1496639 (published on Mar. 2, 2015)

SUMMARY OF THE INVENTION

Accordingly, the present invention has been made keeping in mind the above problems occurring in the related art, and the present invention is intended to propose a coating method of a board for producing a concrete product and a board coated by the same, wherein an outer surface of the board is rapidly coated in a simple process, so coating can be performed simultaneously in a process of manufacturing of the board or in a process of moving the board to a molding machine.

In addition, the present invention is intended to propose a coating method of a board for producing a concrete product and a board coated by the same, wherein a coating layer having a few micrometers of thickness prevents the board from corrosion, a vibration transmission force of the board is maintained above a certain level, the board has an improved separability from produced products, and a coating effect lasts for a long time.

Furthermore, the present invention is intended to propose a coating method of a board for producing a concrete product and a board coated by the same, wherein the coating method is applied equally to the board made of wood, plastic, or composite materials as well as the board made of ordinary steel.

In order to achieve the above objective, according to one aspect of the present invention, there is provided a coating method of a board for producing a concrete product, the coating method including: removing residues existing on an outer surface of the board by blowing high-pressure air to an upper surface and a lower surface of the board for producing a concrete product; coating by spraying coating liquid to the outer surface of the board from which the residues have been removed; and drying the coating liquid by blowing high-pressure air to the outer surface of the board.

In this case, the drying may include heating the air blown to the outer surface of the board to temperature of 40 to 70° C.

In addition, the coating liquid may be manufactured by mixing solid bisphenol A epoxy resin, phenoxy resin, or 2 to 10 wt % of a mixed resin thereof with methyl ethyl ketone or acetone in ketone solvents, or 90 to 98 wt % of a mixed solvent thereof.

Furthermore, the removing of residues may further include: scraping the residues to firstly remove the residues from the surface of the board by using scrapers; and brushing the residues to remove the residues from the surface of the board by using multiple brushes.

Additionally, the coating method may further include: suctioning the residues produced in the brushing by using a dust collector.

In addition, in the coating, a block wall for which an air curtain is used may be provided to prevent the coating liquid from spreading to adjacent areas.

Furthermore, the removing of residues, the coating, and the drying may be performed in a manufacturing process of the board for producing a concrete product.

Additionally, the removing of residues, the coating, and the drying may be performed in a process of transferring the pre-manufactured board for producing a concrete product to a concrete molding machine.

According to the present invention, an outer surface of the board is rapidly coated in a simple process in accordance with a concrete product production cycle, so coating can be simultaneously performed in the manufacturing process of the board or in the process of transferring the board to the molding machine.

In addition, according to the present invention, even a coating layer having a few micrometers of thickness prevents the board from corrosion, a vibration transmission force of the board is maintained above a certain level, and the board has an improved separability from produced products. Accordingly, the durability of the board is improved and the defective rate of concrete products is dramatically lowered.

Furthermore, according to the present invention, the coating method is applied to a product with scratch and corrosion which has been used previously as well as to a new product and allows a long lasting coating effect to be maintained. Accordingly, the production cost of the board is reduced and environmental pollution around the workplace is minimized.

BRIEF DESCRIPTION OF THE DRAWINGS

The above and other objectives, features and other advantages of the present invention will be more clearly understood from the following detailed description when taken in conjunction with the accompanying drawings, in which.

DETAILED DESCRIPTION OF THE INVENTION

Hereinbelow, an exemplary embodiment of a coating method of a board for producing a concrete product and a board coated by the same according to the present invention will be described in detail with reference to the accompanying drawings.

Figure 1:
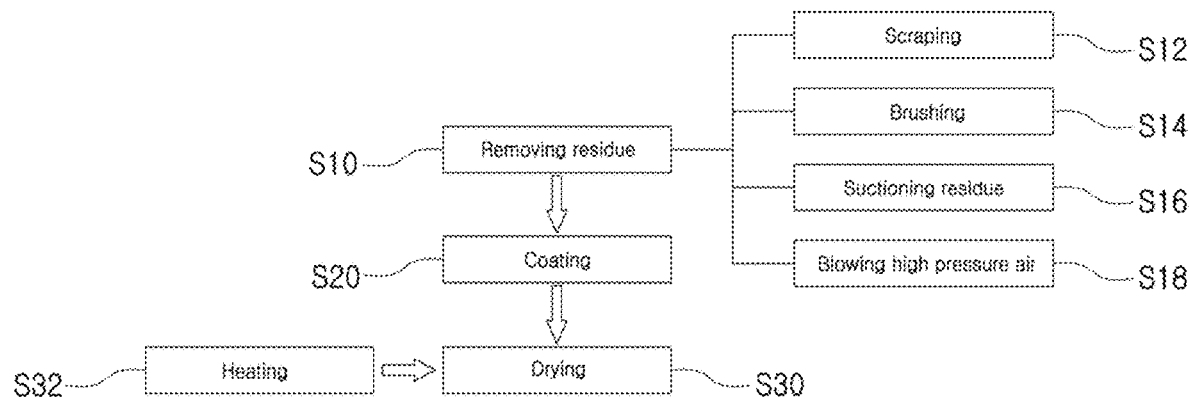
FIG. 1 is a flowchart of sequentially illustrating a coating process of a board for producing a concrete product according to the present invention.
Figure 2:
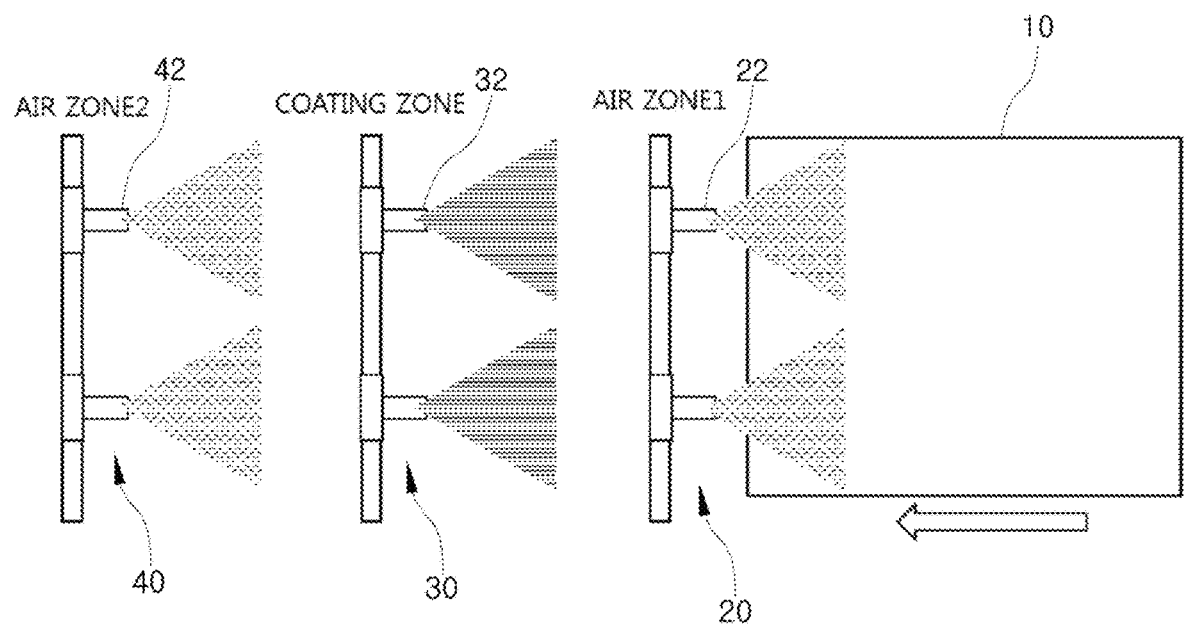
FIG. 2 is a view roughly illustrating the coating process of the board for producing a concrete product according to the present invention.
Figure 3:
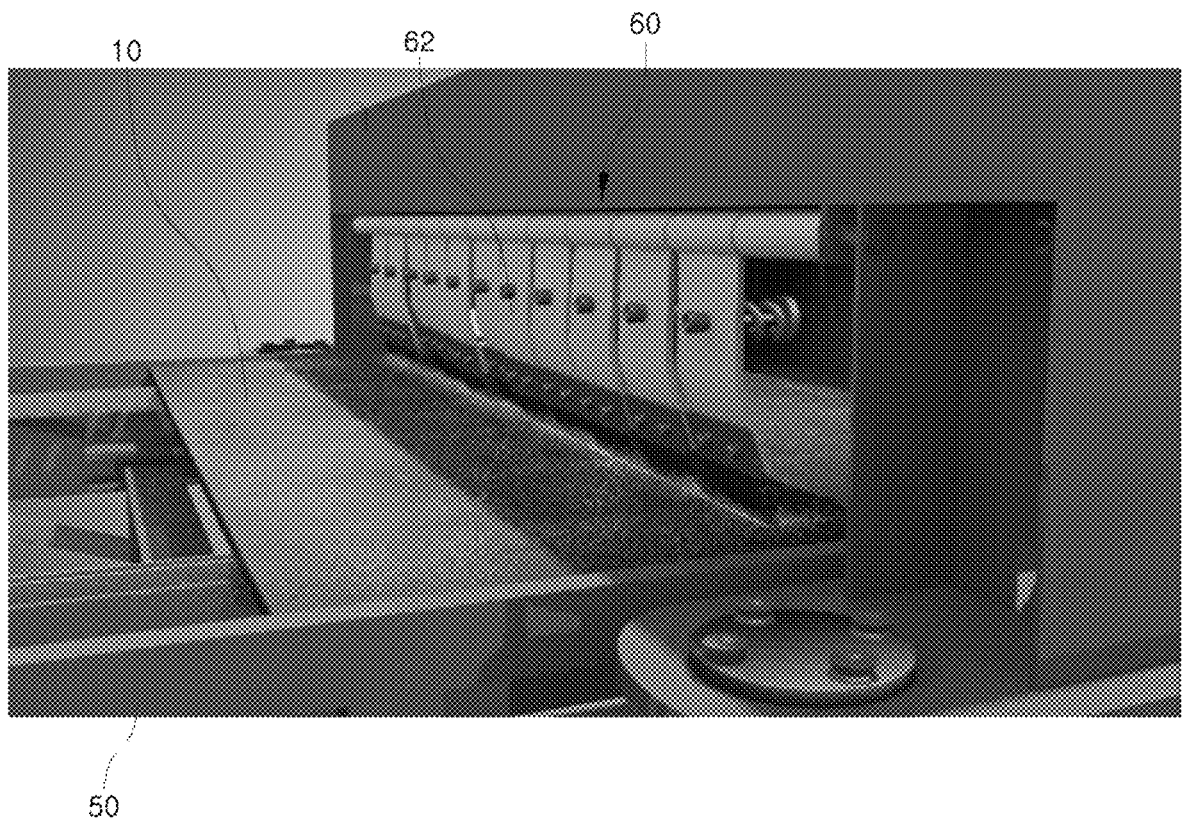
FIG. 3 is a view illustrating a work process of scraping during the removing of residues of the present invention illustrated in FIG. 1.
Figure 4:
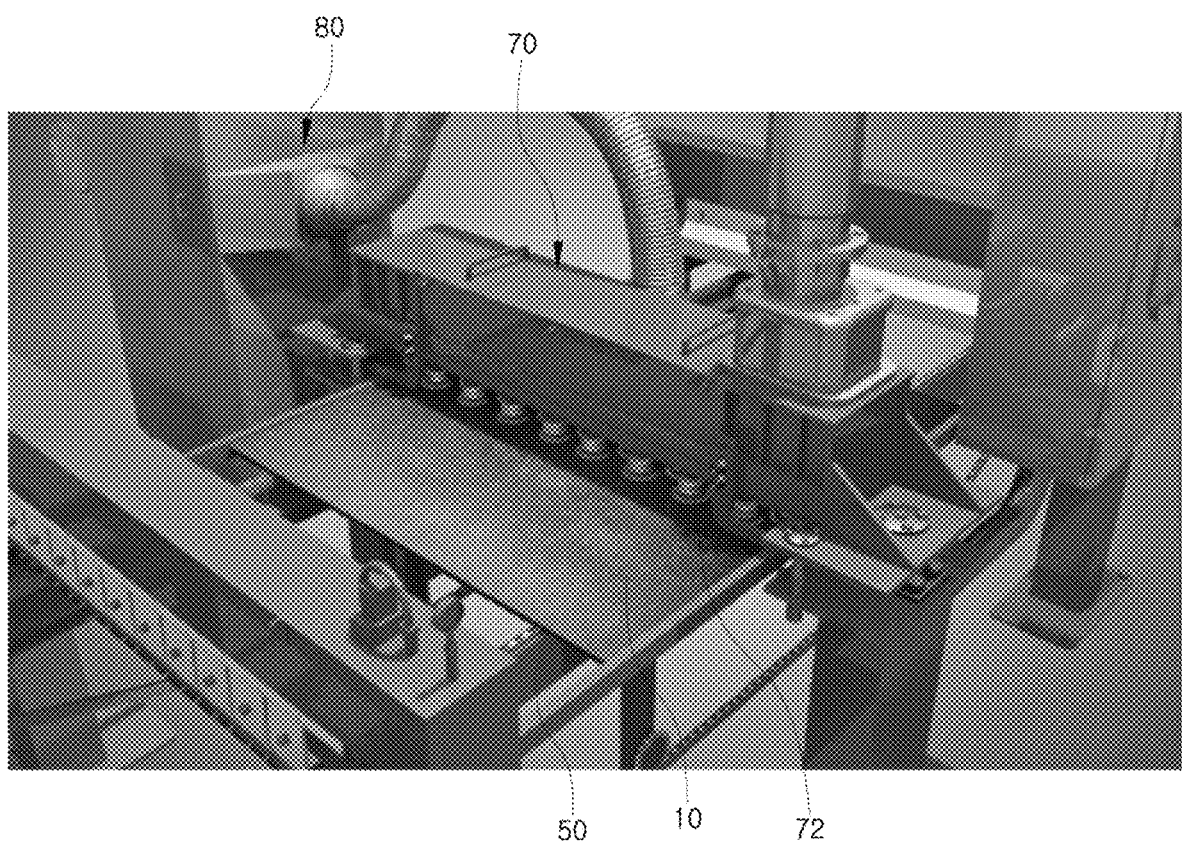
FIG. 4 is a view illustrating a work process of brushing during the removing of residues of the present invention illustrated in FIG. 1.
Figure 5:
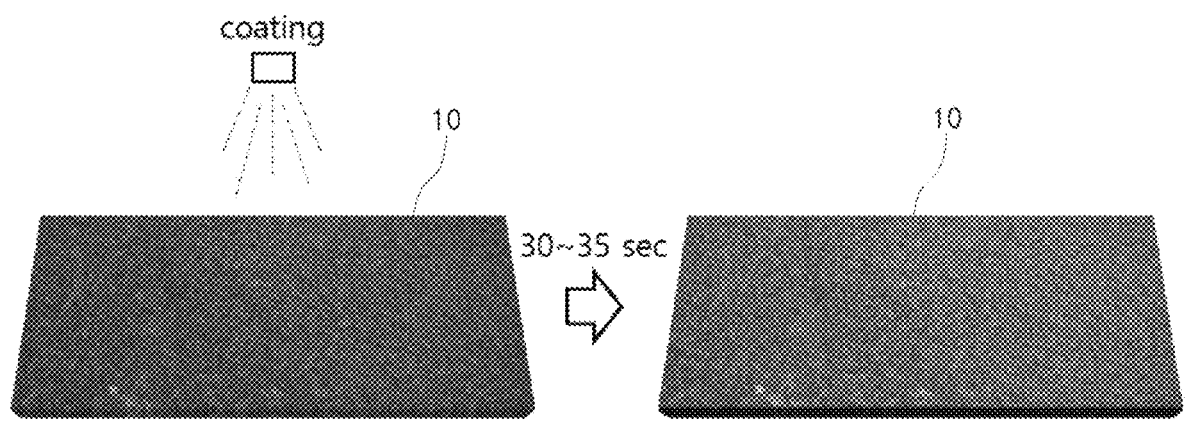
FIG. 5 is a view illustrating the comparison of the appearances of a corroded board before and after coating the corroded board.

FIG. 1 is a flowchart of sequentially illustrating a coating process of a board for producing a concrete product according to the present invention; FIG. 2 is a view roughly illustrating the coating process of the board for producing a concrete product according to the present invention; FIG. 3 is a view illustrating a work process of scraping during removing of residues of the present invention illustrated in FIG. 1; FIG. 4 is a view illustrating a work process of brushing during removing of residues of the present invention illustrated in FIG. 1; and FIG. 5 is a view illustrating the comparison of the appearances of a corroded board before and after coating the corroded board.

The present invention relates to the coating method of a board for producing a concrete product and the board coated by the same, wherein a whole surface of the board used for the production of concrete products can be rapidly coated and dried to prevent the surface corrosion of the board and to prevent further corrosion on a damaged surface of the board, whereby the durability of the board is improved and the quality of the produced concrete products is improved. The coating method of a board for producing a concrete product (hereinbelow, referred to as "a board coating method") according to the present invention largely includes the removing S10 of residues, the coating S20, and drying S30.

To describe more in detail, the removing S10 of residues is the process of removing residues adhering to the surface of the board 10, and the board coating method according to the present invention, which will be described later, may be applied equally to the board 10 that has been used previously as well as to the board 10 that is newly manufactured. Accordingly, residues adhering to an outer surface of the board are removed before coating the board 10.

In this case, as illustrated in FIG. 2, in the removing S10 of residues, residues on the surface of the board are removed by blowing high-pressure air to the surface of the board 10. That is, high-pressure air is blown by using multiple air blowing nozzles 22 toward upper and lower surfaces of the board transferred by a conveying means such as a conveyor 10 and thus residues on the surface of the board 10 are removed. (Blowing high-pressure air at S18)

In addition, to remove the residues from the surface of the board 10 which has been used previously, the removing S10 of residues may further include: the scraping S12 and the brushing S14. First, in the scraping 12, a scraping device 60 having multiple scrapers 62 is used to first remove residues of relatively large volume remaining on the surface of the board 10.

That is, the high-pressure air blowing alone does not completely remove foreign matter such as concrete residues remaining on or attached to the surface of the board 10. As illustrated in FIG. 3, the scraping device 60 including the multiple scrapers 62 is installed above the board 10 transferred by the conveying means 50 such as a conveyor such that the removing work of the residues is first performed by the scrapers 62 in the process of conveying the board.

Next, in the brushing S14, after the first removing work of the residues is completed by the scrapers 62, the residues remaining on the surface of the board 10, that is, residues having relatively small volume are further removed by using a brushing device 70 having multiple brushes 72.

That is, as illustrated in FIG. 4, the brushing device 70 having the multiple brushes 72 rotating at high speed is provided above the conveying means 50 transferring the board 10. Accordingly, in the process of transferring the board, the residues attached to an upper surface of the board 10 are further removed by the brushes 72 rotating at high speed.

Meanwhile, the removing S10 may further include suctioning residues at S16, and in the suctioning S16, the residues removed by the brushing device 70 in the brushing S14 are suctioned by a dust collector 80 installed at a rear of the brushing device 70.

That is, when the residues removed from the board 10 by the brushes 72 rotating at high speed are spattered in a workplace, the residues may penetrate into workers' respiratory tracts and cause respiratory or other diseases. Accordingly, the residues produced in the brushing S14 are suctioned by using the dust collector 80, so a working environment in the workplace can be kept comfortable.

The residues attached to the surface of the board 10 which has been used previously are removed in the process described above, and the blowing of high-pressure air S18 described above is performed to the surface of the board 10 after the brushing S14 and the suctioning S16, so the residues remaining on the surface of the board 10 are more perfectly removed and moisture of the surface of the board 10 is preferably removed to improve coating power in the coating S20 described later.

Next, the coating S20 relates to coating by spraying coating liquid to the outer surface of the board 10 from which the residues are removed. Likewise, the coating work is performed by spraying the coating liquid by using multiple coating-liquid-spray nozzles 32 toward the upper and lower surfaces of the board 10 transferred by the conveying means 50 such as a conveyor.

In this case, in the coating S20, the coating liquid is manufactured by mixing solid bisphenol A epoxy resin or phenoxy resin of high molecular weight, or 2 to 10 wt % of a mixed resin thereof with methyl ethyl ketone or acetone in ketone solvents, or 90 to 98 wt % of a mixed solvent thereof.

That is, in the coating S20, the coating liquid is applied to the outer surface of the board 10 in a thickness of 5 to 15 μm through the multiple coating-liquid-spray nozzles 32 for about 2 to 10 seconds. The coating liquid, in which resin and a solvent are mixed in the above-mentioned ratio, has a suitable viscosity and adheres properly to the surface of the board 10, and the solvent volatilizes within 30 to 35 seconds in a natural state after coating and the surface hardens completely. Accordingly, drying time in the drying S30, which will be described hereinafter, can be decreased. As a result, the time required to coat the board 10 is decreased.

In addition, the phenoxy resin included in the coating liquid is excellent in adhesion with materials, so that the coating liquid can be used regardless of the material of the board 10 and the coating effect thereof is maintained for a longer time.

In this case, the mixing ratio of the coating liquid, that is, the mixing ratio of the resin and the solvent is limited to 2 to 10 wt % and 90 to 98 wt %, respectively, in consideration of the viscosity, bonding strength and the drying time of the coating liquid. However, the mixing ratio may be adjusted within a range similar to the above-mentioned ratio in consideration of the state of the surface of the board 10 or the working environment such as temperature and humidity in the workplace.

Furthermore, the coating liquid functions to fundamentally improve the corrosion resistance and the abrasion resistance of the board 10. As described above, the coating liquid may be applied to the outer surface of the board 10 which has been used previously as well as to the board 10 which is newly manufactured. As illustrated in FIG. 5, when the coating liquid is applied to the board 10 already in the progress of corrosion, the coating liquid does not simply cover rust formed on the surface of the board 10, but the coating liquid hardens and is adsorbed on the surface of the board 10 of steel materials together with rust, so that no further rust occurs. Accordingly, the coating liquid has an excellent anti-rust effect and has the same effect even when applied to the board 10 of wood, plastic or composite materials as well as to the board 10 of steel materials.

In addition, the coating liquid fills up about 1 mm of scratches formed on the board 10 during the molding of concrete products, and improves separability between the board 10 and the concrete products. Accordingly, the coating liquid can decrease the defective rates of produced concrete products and have a lasting coating effect up to one month unlike conventional inexpensive coating agents. Therefore, cost required to coat the board 10 can be reduced.

Meanwhile, a block wall using an air curtain and air knife, etc. may be provided in the vicinity of a coating system (not shown) for performing the coating S20. The block wall functions to prevent the coating liquid sprayed to the board 10 through the multiple coating-liquid-spray nozzles 32 from spreading to the vicinity thereof in the coating S20.

That is, when the coating liquid is scattered in the workplace during the coating work, the coating liquid may be suctioned into the human bodies through workers' respiratory tracts. Accordingly, the block wall using pneumatic pressure such as an air curtain and air knife is provided around the coating system and thus the coating liquid is prevented from spreading to the surroundings.

In this case, the block wall may be installed in front, rear, left, and right surfaces of the coating system, or may be selectively installed on the front and rear surfaces or the left and right surfaces of the coating system in consideration of the structure of the coating system and the working environment in a workplace in which the coating system is installed.

Next, the coating liquid applied to the outer surface of the board 10 in the coating S20 is dried by the high-pressure air in the drying S30.

To describe more in detail, as illustrated in FIG. 2, the high-pressure air is blown by using multiple air blowing nozzles 42 toward the upper and lower surfaces of the board transferred by the conveying means such as a conveyor 10, so the board 10 coated with the coating liquid is dried.

When the board 10 coated with the coating liquid is dried by the high-pressure air as described above, time required for drying the board 10 can be reduced to about 15 to 20 seconds and the coating liquid sticking to the surface of the board 10 can be widely dispersed.

Meanwhile, the drying S30 may include heating S32, and in the heating S32, air to be blown is heated to dry the board 10 to which the coating liquid is applied. Accordingly, high temperature and pressure air is blown to the board 10 such that the drying time is further reduced.

That is, the board coating method according to the present invention is applied equally to the board 10 which has been used previously as well as to the board 10 which is newly manufactured and accordingly, may be performed in the manufacturing process of the board 10 or in the process of conveying the board 10 manufactured to the molding machine. The entire coating work is required to be rapidly performed such that the coating work is not delayed in the manufacturing process of the board 10 or the conveying process of the board 10. Air used in drying the coated board 10 is heated by a heating means (not shown) such as a heater. Accordingly, the high temperature and pressure air is blown to the surface of the board 10, and thus the time required in the entire coating work is minimized.

In this case, the temperature of air used in drying the board 10 is preferably about 40 to 70° C. The reason is that when the air temperature is less than 40° C., the effect of shortening the drying time described above is not realized properly, and when the air temperature exceeds 70° C., the air temperature gets close to the boiling point (about 80° C.) of methyl ethyl ketone, which is a solvent contained in the coating liquid, so that the effect of the coating liquid is not realized properly.

Meanwhile, the coating system used in the board coating method according to the present invention described above includes a first air blowing zone 20, a coating liquid spraying zone 30, a second air blowing zone 40, and the conveying means 50 such as a conveyor of transferring the board 10 such that the board passes through the first air blowing zone 20, the coating liquid spraying zone 30, and the second air blowing zone 40 consecutively.

To describe more in detail, the first air blowing zone 20 is a zone to perform the removing S10 of residues and includes the multiple air blowing nozzles 22 allowing the high-pressure air to be blown to the upper and lower surfaces of the board 10 transferred by the conveying means 50.

Next, the coating liquid spraying zone 30 is located in a rear of the first air blowing zone 20 and is a zone to perform the coating S20.

That is, the coating liquid spraying zone 30 includes the multiple coating-liquid-spray nozzles 32 allowing the coating liquid to be sprayed to the upper and lower surfaces of the board 10 from which the residues are removed by the high-pressure air in the first air blowing zone 20, wherein the multiple coating-liquid-spray nozzles 32 are configured such that spray angles thereof are controlled, so that the coating liquid can be sprayed on edges or side surfaces of the board 10.

The coating S20 performed in the coating liquid spraying zone 30 takes about 2 to 10 seconds, and after the coating is completed, a coating layer of about 5 to 15 μm is formed on the surface of the board 10.

Next, the second air blowing zone 40 is a zone to perform the drying S30 and includes the multiple air blowing nozzles 42 allowing the high-pressure air to be blown to the upper and lower surfaces of the board 10 transferred by the conveying means 50 in the same way as in the first air blowing zone 20.

In addition, as described above, the second air blowing zone 40 may further include the heating means (not shown) such as a heater heating air used in drying the coated board 10, and when the coated board 10 is dried by using the air of about 40 to 70° C. heated by the heating means, time required to dry the board 10 can be shortened to 15 seconds or less.

Next, the conveying means 50 such as a conveyor functions to convey the board 10 to be coated through the first air blowing zone 20, the coating liquid spraying zone 30, and the second air blowing zone 40 consecutively. One conveying means 50 may be used but due to difference in time required for work in each zone, the moving speed of the board 10 is required to be different. Accordingly, one conveying means 50 per each zone is preferably installed to be connected to each other such that the moving speed of the board 10 in each zone is controlled.

In addition, to remove residues from the surface of the board 10 which has been used previously as described above, the scraping device 60 having the multiple scrapers 62 installed above the conveying means 50; the brushing device 70 having the multiple brushes 72 rotating at high speed; and the dust collector 80 for suctioning the residues removed by the brushes 72 from the surface of the board 10 may be included. The scraping device 60, the brushing device 70, and the dust collector 80 are all installed before the first air blowing zone 20.

Meanwhile, as described above, the board coating method according to the present invention can be applied to the board 10 which has been previously as well as to the board 10 which is newly manufactured. Accordingly, the coating system having the above-mentioned configuration may be installed in a production line of the board 10 or a transfer line of the board 10 in which the board 10 is transferred to the molding machine. When the coating system is installed in the production line of the board 10, the coating system is connected to an end of the production line. Therefore, the coating system can be easily installed without changing the existing production line.

In addition, the coating of the board 10 by using the coating system and the board coating method as described above can be completed within about 30 seconds. Accordingly, although the coating system is installed in any line of the production line of the board 10 or the transfer line of the board 10, concrete products can be produced by using the board 10, which is coated, in a time similar to the production time of existing concrete products.

Accordingly, according to the coating method of a board for producing a concrete product and the board coated by the same according to the present invention as described above, the outer surface of the board 10 is rapidly coated in a simple process, so coating can be simultaneously performed in the manufacturing process of the board 10 or in the process of transferring the board 10 to the molding machine. In addition, even a coating layer having a few micrometers of thickness prevents the board 10 from corrosion, a vibration transmission force of the board is maintained above a certain level, and the board has an improved separability from produced products. Accordingly, the durability of the board 10 is improved and the defective rate of concrete products is dramatically lowered. Furthermore, the coating method is applied to the board 10 having scratch and corrosion which has been used previously as well as to a new product, and allows a long lasting coating effect to be maintained.

Accordingly, the production cost of the board is reduced and environmental pollution around the workplace is minimized.

Although the exemplary embodiment of the present invention has been described for illustrative purposes, those skilled in the art will appreciate that various modifications, additions and substitutions are possible, without departing from the scope and spirit of the invention as disclosed in the accompanying claims.

The present invention generally relates to a coating method of a board for producing a concrete product and a board coated by the same. More particularly, the present invention relates to a coating method of a board for producing a concrete product and a board coated by the same, wherein unlike anti-rust oil coating in which coating liquid remains on the existing boards, the whole surface of a board used for the production of concrete products can be rapidly coated and dried to prevent the surface corrosion of the board and to prevent further corrosion on a damaged surface of the board, whereby the durability of the board is improved and the quality of the produced concrete products is improved.

What is claimed is:

1. A coating method of a board for producing a concrete product, the coating method comprising:
   removing residues existing on an outer surface of the board by blowing high-pressure air to an upper surface and a lower surface of the board for producing a concrete product;
   coating by spraying coating liquid to the outer surface of the board from which the residues have been removed, wherein a coating thickness ranges 5 to 15 µm; and
   drying the coating liquid by blowing high-pressure air to the outer surface of the board,
   wherein the coating liquid is manufactured by mixing 2 to 10 wt % of a mixed resin including solid bisphenol A epoxy resin and phenoxy resin with 90 to 98 wt % of a mixed solvent including methyl ethyl ketone and acetone.

2. The coating method of claim 1, wherein the drying comprises heating the air blown to the outer surface of the board to temperature of 40 to 70° C.

3. The coating method of claim 1, wherein the removing of residues further comprises:
   scraping the residues to firstly remove the residues from the surface of the board by using scrapers; and
   brushing the residues to remove the residues from the surface of the board by using multiple brushes.

4. The coating method of claim 3, further comprising:
   suctioning the residues produced in the brushing by using a dust collector.

5. The coating method of claim 1, wherein in the coating, a block wall for which an air curtain is used is provided to prevent the coating liquid from spreading to adjacent areas.

6. The coating method of claim 1, wherein the removing of residues, the coating, and the drying are performed in a manufacturing process of the board for producing a concrete product.

7. The coating method of claim 1, wherein the removing of residues, the coating, and the drying are performed in a process of transferring the pre-manufactured board for producing a concrete product to a concrete molding machine.

* * * * *